(12) United States Patent
Kang et al.

(10) Patent No.: US 12,053,753 B2
(45) Date of Patent: Aug. 6, 2024

(54) APPARATUS AND METHOD FOR PREPARING AEROGEL BLANKET

(71) Applicant: LG CHEM, LTD., Seoul (KR)

(72) Inventors: Tae Gyeong Kang, Daejeon (KR); Bong June Kim, Daejeon (KR); Se Won Baek, Daejeon (KR)

(73) Assignee: LG Chem, Ltd., Seoul (KR)

( * ) Notice: Subject to any disclaimer, the term of this patent is extended or adjusted under 35 U.S.C. 154(b) by 250 days.

(21) Appl. No.: 17/416,619

(22) PCT Filed: Jun. 10, 2020

(86) PCT No.: PCT/KR2020/007517
§ 371 (c)(1),
(2) Date: Jun. 21, 2021

(87) PCT Pub. No.: WO2021/045356
PCT Pub. Date: Mar. 11, 2021

(65) Prior Publication Data
US 2022/0072734 A1    Mar. 10, 2022

(30) Foreign Application Priority Data
Sep. 3, 2019 (KR) ........................ 10-2019-0109158

(51) Int. Cl.
*B01J 13/00*    (2006.01)
*B01J 16/00*    (2006.01)
*B28B 1/38*     (2006.01)
*B28B 1/40*     (2006.01)
*B28B 1/52*     (2006.01)
(Continued)

(52) U.S. Cl.
CPC ............ *B01J 13/0091* (2013.01); *B28B 1/38* (2013.01); *B28B 1/40* (2013.01); *B28B 1/52* (2013.01);
(Continued)

(58) Field of Classification Search
CPC ......... B01J 13/0091; B01J 16/00; B28B 1/40; B28B 1/38; B28B 1/52; B28B 1/525;
(Continued)

(56) References Cited

U.S. PATENT DOCUMENTS 1,131,270 A * 3/1915 Quick ...................... D06B 5/00
8/154
5,789,075 A   8/1998 Frank et al.
(Continued)

FOREIGN PATENT DOCUMENTS

CN    101137587         3/2008
CN    101698583 A       4/2010
(Continued)

OTHER PUBLICATIONS

Machine Translation of CN 109868598 (Year: 2019).*
(Continued)

*Primary Examiner* — Lessanework Seifu
(74) *Attorney, Agent, or Firm* — Bryan Cave Leighton Paisner LLP

(57) ABSTRACT

Provided is an apparatus for preparing an aerogel blanket, the apparatus comprising: a bobbin around which a blanket is wound; a body provided with a gelling tank in which the bobbin is accommodated; a driving member configured to allow the bobbin accommodated in the gelling tank to rotate; and a silica sol supply member configured to gelate the blanket as silica sol is injected into the gelling tank to impregnate the blanket rotating by the bobbin.

12 Claims, 11 Drawing Sheets

(51) Int. Cl.
  *B28B 21/46* (2006.01)
  *C01B 33/145* (2006.01)
  *C01B 33/155* (2006.01)
  *C01B 33/158* (2006.01)
(52) U.S. Cl.
  CPC .............. *B28B 1/525* (2013.01); *B28B 21/46* (2013.01); *C01B 33/145* (2013.01); *C01B 33/155* (2013.01); *C01B 33/1585* (2013.01)
(58) Field of Classification Search
  CPC ..... B28B 21/46; C01B 33/145; C01B 33/155; C01B 33/1585
  See application file for complete search history.

(56) References Cited

U.S. PATENT DOCUMENTS

| | | | |
|---|---|---|---|
| 5,830,387 | A | 11/1998 | Yokogawa et al. |
| 6,068,882 | A | 5/2000 | Ryu |
| 6,364,953 | B1 | 4/2002 | Kawakami et al. |
| 6,799,442 | B1 | 10/2004 | Costa et al. |
| 11,059,262 | B2 | 7/2021 | Oh et al. |
| 2001/0034375 | A1 | 10/2001 | Schwertfeger et al. |
| 2005/0046086 | A1 | 3/2005 | Lee et al. |
| 2005/0167891 | A1 | 8/2005 | Lee et al. |
| 2008/0093016 | A1 | 4/2008 | Lee et al. |
| 2009/0123358 | A1 | 5/2009 | Costa et al. |
| 2012/0025127 | A1 | 2/2012 | Yeo et al. |
| 2016/0096949 | A1 | 4/2016 | Evans et al. |
| 2018/0009969 | A1 | 1/2018 | Kim et al. |
| 2018/0029892 | A1 | 2/2018 | Yu et al. |
| 2018/0072578 | A1 | 3/2018 | Kim et al. |
| 2018/0094114 | A1 | 4/2018 | Evans et al. |
| 2018/0112057 | A1 | 4/2018 | Evans et al. |
| 2018/0112058 | A1 | 4/2018 | Evans et al. |
| 2018/0134867 | A1 | 5/2018 | Evans et al. |
| 2018/0147811 | A1 | 5/2018 | Oh et al. |
| 2018/0148888 | A1 | 5/2018 | Kim et al. |
| 2018/0179073 | A1 | 6/2018 | Oh et al. |
| 2018/0179074 | A1 | 6/2018 | Kim et al. |
| 2018/0179075 | A1* | 6/2018 | Kim ................ B05D 3/0254 |
| 2018/0244029 | A1 | 8/2018 | Kim et al. |
| 2018/0264793 | A1 | 9/2018 | Kim et al. |
| 2018/0326700 | A1 | 11/2018 | Kim |
| 2018/0354805 | A1 | 12/2018 | Kim et al. |
| 2019/0002356 | A1 | 1/2019 | Hebalkar |
| 2019/0062167 | A1 | 2/2019 | Kim et al. |
| 2019/0119494 | A1 | 4/2019 | Makino et al. |
| 2019/0203014 | A1 | 7/2019 | Evans et al. |
| 2019/0276322 | A1 | 9/2019 | Kim et al. |
| 2020/0025324 | A1 | 1/2020 | Izumi et al. |
| 2020/0048100 | A1 | 2/2020 | Yu et al. |
| 2020/0215791 | A1 | 7/2020 | Oh et al. |
| 2020/0216322 | A1 | 7/2020 | Min et al. |
| 2020/0224005 | A1 | 7/2020 | Kim et al. |
| 2020/0255295 | A1 | 8/2020 | Kim et al. |
| 2020/0308011 | A1 | 10/2020 | Kim et al. |
| 2021/0114887 | A1 | 4/2021 | Oh et al. |
| 2021/0155486 | A1 | 5/2021 | Kang et al. |
| 2021/0198112 | A1 | 7/2021 | Oh et al. |
| 2022/0048778 | A1 | 2/2022 | Kim et al. |
| 2022/0204350 | A1 | 6/2022 | Oh et al. |

FOREIGN PATENT DOCUMENTS

| | | |
|---|---|---|
| CN | 103910516 | 7/2014 |
| CN | 104164758 A | 11/2014 |
| CN | 105597635 | 5/2016 |
| CN | 105664809 | 6/2016 |
| CN | 106630930 A | 5/2017 |
| CN | 106794996 | 5/2017 |
| CN | 107034678 A | 8/2017 |
| CN | 107129262 | 9/2017 |
| CN | 107406327 A | 11/2017 |
| CN | 107523275 | 12/2017 |
| CN | 107531495 A | 1/2018 |
| CN | 107709013 A | 2/2018 |
| CN | 107735362 | 2/2018 |
| CN | 107735385 | 2/2018 |
| CN | 107848815 A | 3/2018 |
| CN | 207310663 U | 5/2018 |
| CN | 108136749 A | 6/2018 |
| CN | 108383129 | 8/2018 |
| CN | 108585762 | 9/2018 |
| CN | 108658572 A | 10/2018 |
| CN | 108689678 A | 10/2018 |
| CN | 108821741 | 11/2018 |
| CN | 109415214 A | 3/2019 |
| CN | 109437832 | 3/2019 |
| CN | 109868598 A | 6/2019 |
| CN | 110615663 | 12/2019 |
| CN | 111925186 A | 11/2020 |
| EP | 3284720 A1 | 2/2018 |
| EP | 3375757 A1 | 9/2018 |
| EP | 3453676 A1 | 3/2019 |
| EP | 3569304 A | 11/2019 |
| EP | 3778483 A1 | 2/2021 |
| EP | 3878812 A1 | 9/2021 |
| EP | 3901093 A1 | 10/2021 |
| EP | 3901094 A1 | 10/2021 |
| JP | 2001-007100 | 1/2001 |
| JP | 2001-072408 | 3/2001 |
| JP | 2003-513873 A | 4/2003 |
| JP | 4115088 | 7/2008 |
| JP | 2008-532898 | 8/2008 |
| JP | 2011-190136 | 9/2011 |
| JP | 2012-144428 | 8/2012 |
| JP | 2014-173222 | 9/2014 |
| JP | 2017-533163 | 11/2017 |
| JP | WO2017-010551 | 2/2018 |
| JP | 2018-523022 | 8/2018 |
| JP | 2018-532682 | 11/2018 |
| JP | 2018-535178 | 11/2018 |
| JP | 2018-204725 | 12/2018 |
| JP | 2018-537311 | 12/2018 |
| JP | 2018-537383 | 12/2018 |
| JP | 2018-538224 | 12/2018 |
| JP | 2021-523869 | 9/2021 |
| KR | 10-2001-0104372 | 11/2001 |
| KR | 10-0372823 | 2/2003 |
| KR | 10-0385829 | 10/2003 |
| KR | 10-0710887 | 4/2007 |
| KR | 10-2007-0114668 | 12/2007 |
| KR | 10-0831877 | 5/2008 |
| KR | 10-2010-0053350 | 5/2010 |
| KR | 10-2010-0133268 | 12/2010 |
| KR | 10-2011-0067163 | 6/2011 |
| KR | 10-2011-0082379 | 7/2011 |
| KR | 10-2011-0126381 | 11/2011 |
| KR | 10-2012-0012836 | 2/2012 |
| KR | 10-1147494 | 5/2012 |
| KR | 10-2012-0070948 | 7/2012 |
| KR | 10-1176137 | 8/2012 |
| KR | 10-2014-0120721 | 10/2014 |
| KR | 10-1498562 | 3/2015 |
| KR | 10-2016-0101330 | 8/2016 |
| KR | 10-2017-0031011 A | 3/2017 |
| KR | 10-2017-0063800 | 6/2017 |
| KR | 10-2017-0086831 | 7/2017 |
| KR | 10-2017-0096513 | 8/2017 |
| KR | 10-2017-0096514 | 8/2017 |
| KR | 10-2017-0098003 | 8/2017 |
| KR | 10-2017-0098592 | 8/2017 |
| KR | 10-2017-0112985 | 10/2017 |
| KR | 10-2018-0029235 | 3/2018 |
| KR | 10-2018-0033064 | 4/2018 |
| KR | 10-2018-0132723 A | 12/2018 |
| KR | 10-2019-0008007 | 1/2019 |
| KR | 10-1953349 | 2/2019 |
| KR | 10-2019-0021956 | 3/2019 |
| KR | 10-1953347 | 5/2019 |
| KR | 10-2019-0063799 | 6/2019 |
| KR | 10-2019-0065325 | 6/2019 |
| KR | 10-2019-0078765 | 7/2019 |

(56) References Cited

FOREIGN PATENT DOCUMENTS

| KR | 10-2019-0098728 | 8/2019 |
| KR | 10-2023531 | 9/2019 |
| KR | 10-2020-0063084 | 6/2020 |
| WO | 2016-054524 A2 | 4/2016 |
| WO | 2017/145359 A1 | 8/2017 |
| WO | 2017-171217 | 10/2017 |
| WO | 2018/208005 A1 | 11/2018 |
| WO | 2019-039841 | 2/2019 |
| WO | 2019-098519 | 5/2019 |
| WO | 2019-107706 | 6/2019 |
| WO | 2021-045483 | 3/2021 |

OTHER PUBLICATIONS

Aspen Aerogels, AR5100, Vibration Testing Report, Feb. 4, 2003, 1 page.
Rao et al., "Synthesis and Characterization of Hydrophobic TMES/TEOS Based Silica Aerogels," Journal of Porous Materials 10:23-29 (2003).
Ma et al., "Preparation and Low-temparature Properties of Fiber Reinforced $SiO_2$ Aerogel Composites," Materials Review 29(10):43-46, 63 (2015), [English Language Abstract included].
Zhang et al., "Hygrothermal performance of silica aerogel composite for thermal insulation material," New Building Materials 3:67-71 (2017), [English Language Abstract included].
Subramaniam Iswar et al., "Effect of aging on silica aerogel properties", Microporous and Mesoporous Materials, vol. 241, Mar. 15, 2017, pp. 293-302.
Yokogawa et al., Hydrophobic silica aerogels, Journal of Non-Crystalline Solids, vol. 186, Jun. 2, 1995, pp. 23-29.

\* cited by examiner

APPARATUS AND METHOD FOR PREPARING AEROGEL BLANKET

CROSS-REFERENCE TO RELATED APPLICATION

This application is a National Stage Application of International Application No. PCT/KR2020/007517 filed on Jun. 10, 2020, which claims the benefit of the priority of Korean Patent Application No. 10-2019-0109158, filed on Sep. 3, 2019, which is hereby incorporated by reference in its entirety.

TECHNICAL FIELD

The present invention relates to an apparatus and method for preparing an aerogel blanket, and more particularly, to an apparatus and method for preparing an aerogel blanket, which are capable of improving productivity of the aerogel blanket.

BACKGROUND

In general, aerogel is a material having a high specific surface area (500 $m^2/g$) with a porosity of about 90% to about 99.9% and a pore size ranging of 1 nm to 100 nm. Since the aerogel has characteristics such as excellent lightweight/ultra-insulation/ultra-low dielectric properties, studies on the development of aerogel materials and application studies on transparent insulation materials, environmentally friendly high-temperature insulation materials, ultra-low dielectric thin film materials for highly integrated devices, materials for catalysts and catalyst carriers, electrode materials for super capacitors, and electrode materials for seawater desalination.

The above-described aerogel can be combined with fibers so as to be commercialized in the form such as an aerogel blanket or aerogel sheet. In the case of the blanket or sheet, since the blanket or sheet has flexibility, the blanket or sheet can be bent, folded, or cut in a predetermined size or shape. Thus, the aerogel can be applied not only to industrial applications such as insulation panels for LNG carriers, industrial insulation materials, and insulation materials for space suits, transportation and vehicles, and power generation, but also to household goods such as jackets and sneakers. Also, when the aerogel is used for fire doors as well as roofs or floors in the house such as apartments, there is a great effect in preventing fire.

The aerogel blanket is a material in which aerogel is impregnated and is prepared by mixing and gelling silica sol in the blanket.

However, it takes a long time to prepare the above-described aerogel blanket, and accordingly, it is difficult to mas-produce the aerogel blanket.

BRIEF DESCRIPTION

Technical Problem

The present invention has been invented to solve the above problems, and an object of the present invention is to provide an apparatus and method for preparing an aerogel blanket, which are capable of improving productivity of the aerogel blanket to mass-produce the aerogel blanket.

Technical Solution

An apparatus for preparing an aerogel blanket according to the present invention for achieving the above object comprises: a bobbin around which a blanket is wound; a main body provided with a gelling tank in which the bobbin is accommodated; a driving member configured to allow the bobbin accommodated in the gelling tank to rotate; and a silica sol supply member configured to gelate the blanket as silica sol is injected into the gelling tank to impregnate the blanket rotating by the bobbin.

The bobbin can comprise a winding rod around which the blanket is wound into a roll shape and a separate support plate coupled to each end of the winding rod to support a side portion of the blanket wound around the winding rod.

The winding rod can have an inner portion in which a hollow, into which the silica sol injected into the gelling tank is introduced, is defined, and an outer portion in which a plurality of connection holes, through which the silica sol introduced into the hollow is discharged to the outside of the winding rod so as to impregnate into the blanket wound around the winding rod, are defined.

A plurality of opening holes can be defined in the support plate.

The gelling tank can comprise a gelling chamber that is provided inside the gelling tank to accommodate the bobbin, a discharge part provided at an outer lower end of the gelling tank and connected to the gelling chamber, and an inflow part provided at an outer upper end of the gelling tank and connected to the gelling chamber, and the gelling chamber can have a U-shaped cross-sectional shape of which an upper portion is covered by a cover that can be opened.

The gelling tank can comprise a rotation member provided on both wall surfaces of the gelling chamber and coupled to both ends of the bobbin so that the bobbin is rotatably installed in the gelling chamber.

A coupling groove can be defined in each of both ends of the bobbin, and a coupling protrusion can be disposed on the rotation member, and the bobbin and the rotation member can be interlocked with each other to rotate by coupling of the coupling groove and the coupling protrusion.

The driving member can allow the bobbin to rotate through a rotation member provided in the gelling tank.

The gelling tank can comprise a rotation handle coupled to the other rotation member provided in the gelling tank to allow the bobbin to rotate.

A method for preparing an aerogel blanket according to the present invention comprises: a winding step (S10) of winding a blanket around a bobbin; an accommodation step (S20) in which the bobbin around which the blanket is wound is rotatably installed inside a gelling tank; a silica sol preparation step (S30) of injecting a precursor solution and a catalyst solution into a silica sol supply member to mix the precursor solution and the catalyst solution with each other, thereby preparing silica sol; a rotation step (S40) of allowing the bobbin, around which the blanket is wound, to rotate via a driving member; and a gelation step (S50) of injecting the silica sol mixed in the silica sol supply member into the gelling tank to impregnate the silica sol into the blanket rotating by the bobbin, thereby gelating the blanket.

In the rotation step (S40), the blanket can be gelated while the bobbin rotates at a speed of 15 rpm to 325 rpm, preferably, a speed of 30 rpm to 200 rpm.

In the gelation step (S50), the silica sol can be injected to an amount of 80% to 120% based on a volume of the blanket.

The method can further comprise, after the gelation step (S50), a collection step (S60) of collecting the silica sol remaining in the gelling tank.

The method can further comprise, after the collection step (S60), an aging step (S70) of injecting an aging solution into the gelling tank to age the blanket rotating by the bobbin and to collect the aging solution remaining in the gelling tank when the aging of the blanket is completed.

The method can further comprise, after the aging step (S70), a surface modifying step (S80) of injecting a surface modifying solution into the gelling tank to modify a surface of the blanket rotating by the bobbin and to collect the surface modifying solution remaining in the gelling tank when the surface modification of the blanket is completed.

The method can further comprise, after the surface modifying step (S80), a drying step (S90) of drying the blanket to complete the aerogel blanket.

In the accommodation step (S20), when the bobbin around which the blanket is wound is accommodated in the gelling chamber of the gelling tank, and both ends of the bobbin are coupled to a rotation member that is rotatably provided on both wall surfaces of the gelling chamber, the bobbin around which the blanket is wound can be rotatably installed inside the gelling tank.

Advantageous Effects

The apparatus for preparing the aerogel blanket can comprise the bobbin, the main body provided with the gelling tank, the driving member, and the silica sol supply member. That is, the silica sol can be impregnated to be gelated, aged, surface-modified, and dried in the state in which the blanket rotates in the gelling tank. Due to these characteristics, the time taken to prepare the aerogel blanket can be significantly reduced. Therefore, the productivity of the production of the aerogel blanket can be significantly improved to facilitate the mass-production of the aerogel blanket. Particularly, the blanket can rotate to uniformly gelate the entire blanket.

Also, in the apparatus for preparing the aerogel blanket according to the present invention, the bobbin can comprise the winding rod and a support plate at each end of the winding rod. Due to these features, the blanket can be stably wound around the bobbin. Particularly, the blanket can be wound at the same position maintained via the support plate to improve the efficiency in work.

Also, in the apparatus for preparing the aerogel blanket, the winding rod can comprise the hollow and the plurality of connection holes. Due to these features, the silica sol can be effectively introduced into the inside of the blanket wound around the winding rod. Therefore, the inside of the blanket can be stably gelated, and thus, the entire blanket can be uniformly gelated, and the time taken to gelate the blanket can be significantly reduced.

Also, in the apparatus for preparing the aerogel blanket according to the present invention, each support plate can comprise a plurality of opening holes. Due to these features, the silica sol can be introduced into the side portion of the blanket wound around the winding rod. Therefore, the side portion of the blanket can be stably gelated to uniformly gelate the entire blanket and significantly reduce the gelation time of the blanket.

Also, in the apparatus for preparing the aerogel blanket according to the present invention, the gelling tank can have the U-shaped cross-section. Due to these features, the contact force between the silica sol stored on the bottom of the gelling tank and the blanket can be improved, and thus, the injected sol can be impregnated into the blanket to minimize the consumption of the sol and improve the gelation of the blanket. That is, the space between the bottom of the gelling tank and the blanket can be minimized to induce the impregnation of all the sol into the blanket.

Also, in the apparatus for preparing the aerogel blanket according to the present invention, the gelling tank can comprise the rotation member that is configured to rotatably install the bobbin. Due to these features, the bobbin can stably rotate in the gelling tank.

Also, in the apparatus for preparing the aerogel blanket according to the present invention, the bobbin and the rotation member can be coupled to each other through the coupling groove and the coupling protrusion. Due to this feature, the rotation member and the bobbin can be easily connected to or separated from each other to improve the efficiency in work.

DETAILED DESCRIPTION

Figure 1:
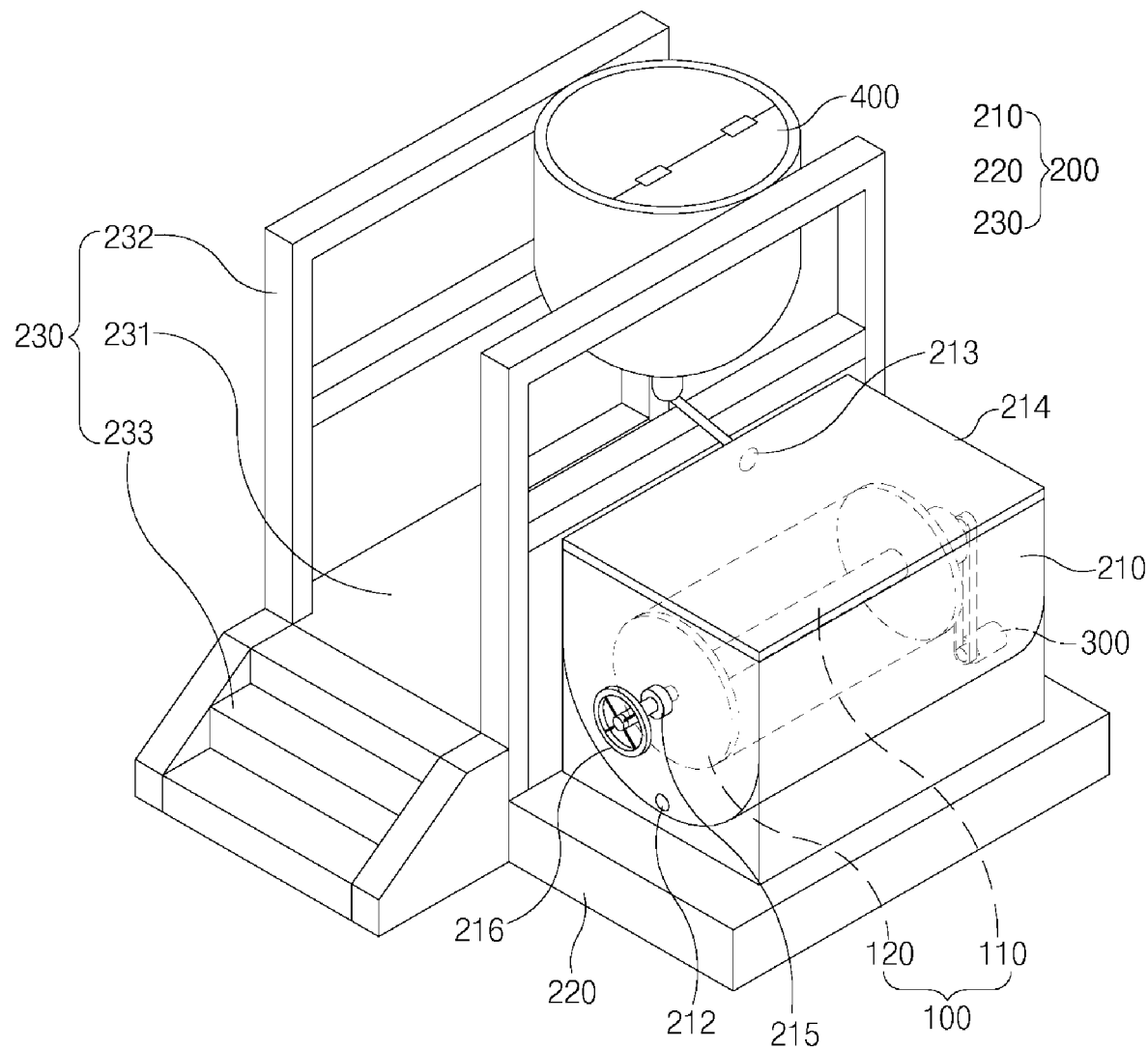
FIG. 1 is a perspective view illustrating an apparatus for preparing an aerogel blanket according to a first embodiment of the present invention.

Hereinafter, embodiments of the present invention will be described in detail with reference to the accompanying drawings in such a manner that the technical idea of the present invention can easily be carried out by a person with ordinary skill in the art to which the invention pertains. The present invention can, however, be embodied in different forms and should not be construed as limited to the embodiments set forth herein. In the drawings, anything unnecessary for describing the present invention will be omitted for clarity, and also like reference numerals in the drawings denote like elements.

<Apparatus for Preparing Aerogel Blanket According to First Embodiment of the Present Invention>

As illustrated in FIGS. 1 to 9, an apparatus for preparing an aerogel blanket according to a first embodiment of the present invention comprises a bobbin 100 around which a blanket 10 is wound, a main body 200 provided with a gelling tank 210 in which the bobbin 100 is accommodated, a driving member 300 configured to allow the bobbin 100 accommodated in the gelling tank 210 to rotate, a silica sol supply member 400 configured to provide silica sol to gelate the blanket 10 as silica sol 20 is injected into the gelling tank 210 so as to be mixed into the blanket 10 that rotates by the bobbin 100, an aging member 500 that ages the blanket 10, which rotates by the bobbin 100, by injecting an aging solution into the gelling tank 210, a surface modifying member 600 that modifies a surface of the blanket 10 by injecting a surface modifying solution into the gelling tank 210, and a drying member 700 in which the gelling tank 210 increases in temperature to dry the blanket 10 that rotates by the bobbin 100.

Bobbin

Figure 5:
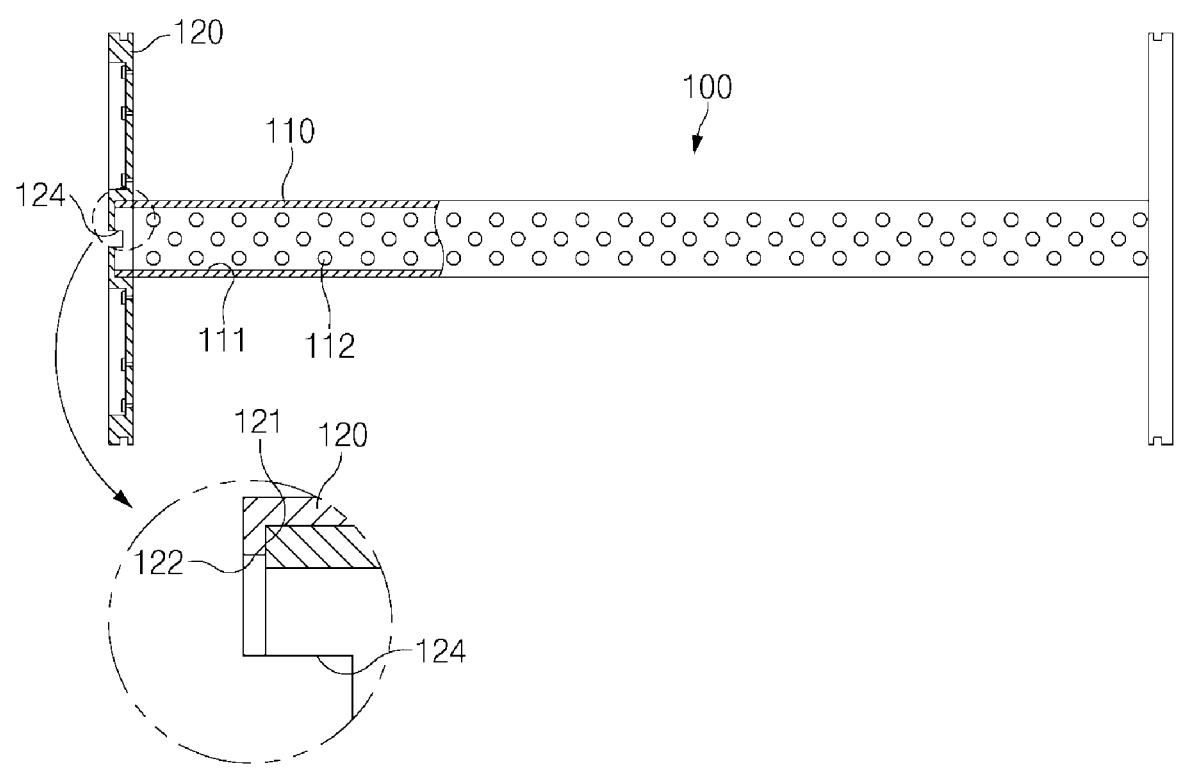
FIG. 5 is a front view illustrating a bobbin in the apparatus for preparing the aerogel blanket according to the first embodiment of the present invention.
Figure 6:
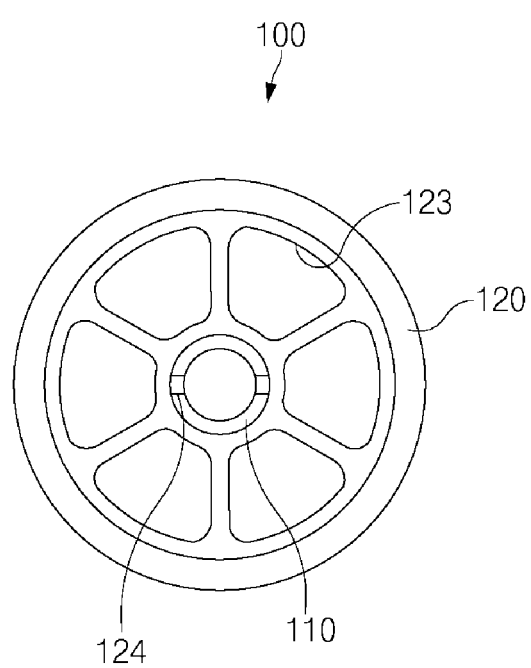
FIG. 6 is a side cross-sectional view of FIG. 5.
Figure 7:
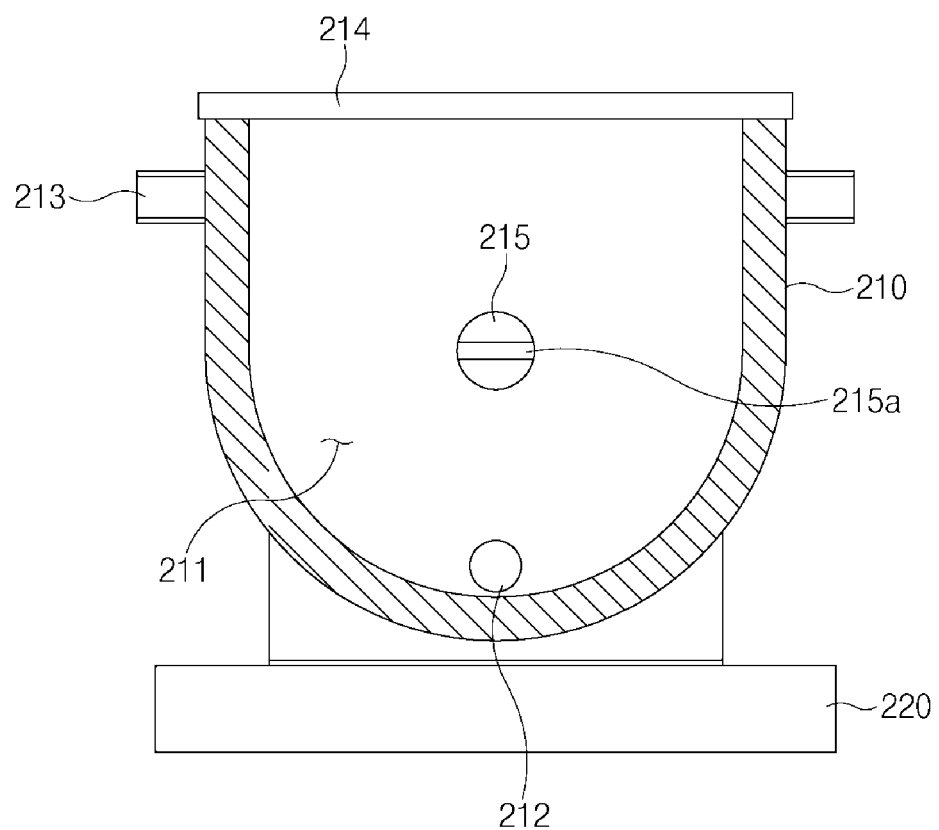
FIG. 7 is a cross-sectional view illustrating a gelling tank in the apparatus for preparing the aerogel blanket according to the first embodiment of the present invention.

As illustrated in FIGS. 5 and 6, the bobbin 100 is configured to wind the blanket in a roll shape and comprises a winding rod 110 around which the blanket 10 is wound in a roll shape and a separate support plate 120 coupled to each end of the winding rod 110 to support a side portion of the blanket 10 wound around the winding rod 110.

The winding rod 110 has a cylindrical shape with a hollow 111 that runs the length of the winding rod 110 in a longitudinal direction, and the blanket 10 having a long sheet shape is wound around an outer surface of the winding rod 110.

The silica sol can be quickly impregnated into an outer portion of the blanket 10 wound around the winding rod 110 to stably gelate the blanket 10. However, it can take a long time to impregnate an inner portion of the blanket 10 by using the silica sol. To prevent this problem, a plurality of connection holes 112 connected to the hollow 111 are defined in an outer circumferential surface of the winding rod 110.

That is, the hollow 111 can be defined in the winding rod 110 so that the silica sol injected into the gelling tank 210 is introduced. The plurality of connection holes 112, through which the silica sol introduced into the hollow 111 is discharged out of the winding rod 110 to impregnate the inner portion of the blanket 10 wound around the winding rod 110 so as to allow impregnation into the inner portion of the blanket 10 wound around the winding rod 110, are defined in the winding rod 110. Thus, the inner portion and the outer portion of the blanket 10 can be gelated at the same time by impregnating the silica sol. Therefore, a time taken to gelate the blanket 10 can be significantly reduced to uniformly gelate the entire blanket 10.

Each of the plurality of connection holes 112 has a diameter of 3 mm to 5 mm, and the plurality of connection holes 112 are defined at regular intervals in the outer circumferential surface of the winding rod 110. Thus, the silica sol can be uniformly supplied to the entire blanket 10 wound around the outer circumferential surface of the winding rod 110 to uniformly gelate the entire inside of the blanket 10.

The support plate 120 is configured to support the blanket wound around the winding rod 110 so that the blanket is not irregularly wound. The support plate 120 has a disc shape and a separate support plate 120 is coupled to each end of the winding rod 110 to support the side portion of the blanket 10 wound around the winding rod 110.

The support plate 120 comprises a coupling groove 121, to which an end of the winding rod 110 is coupled, and a coupling hole 122 defined in a bottom surface of the coupling groove 121. That is, the support plate 120 can be coupled to the end of the winding rod 110 through the coupling groove 121.

A plurality of opening holes 123 can be defined in the support plate 120. The silica sol can be introduced into the side portion of the blanket 10 wound around the winding rod 110 through the plurality of opening holes 123, and thus, the side portion of the blanket 10 can be stably gelated.

Therefore, the bobbin 100 comprises the winding rod 110 and a support plate 120 at each end to wind the blanket in a roll shape.

Main Body

The main body 200 is configured to install the gelling tank in which the bobbin is accommodated and comprises the gelling tank 210 and a first installation member 220 on which the gelling tank 210 is installed.

The gelling tank 210 is configured to gelate the blanket wound around the bobbin and comprises a gelling chamber 211 that is provided inside the gelling tank 210 to accommodate the bobbin 100, a discharge part 212 provided at an outer lower end of the gelling tank 210 and connected to the gelling chamber 211, and an inflow part 213 provided at an outer upper end of the gelling tank 210 and connected to the gelling chamber 211.

Particularly, the gelling chamber 211 of the gelling tank 210 has a U-shaped cross-sectional shape of which an upper portion is covered by a cover 214 that can be opened, and a lower portion has a curvature corresponding to the blanket 10 wound around the winding rod 110. Thus, when the silica sol is introduced into the gelling chamber 211, contact force between the silica sol and the blanket 10 can increase to improve gelation of the blanket 10.

The gelling tank 210 comprises a rotation member 215 provided on both wall surfaces of the gelling chamber 211 and coupled to both ends of the bobbin 100 so that the bobbin 100 is rotatably installed in the gelling chamber 211.

The rotation member 215 is rotatably installed in a through-hole defined in each of both the wall surfaces of the gelling chamber so that the end of the bobbin 100 accommodated in the gelling chamber 211 is capable of transmitting power.

Figure 8:
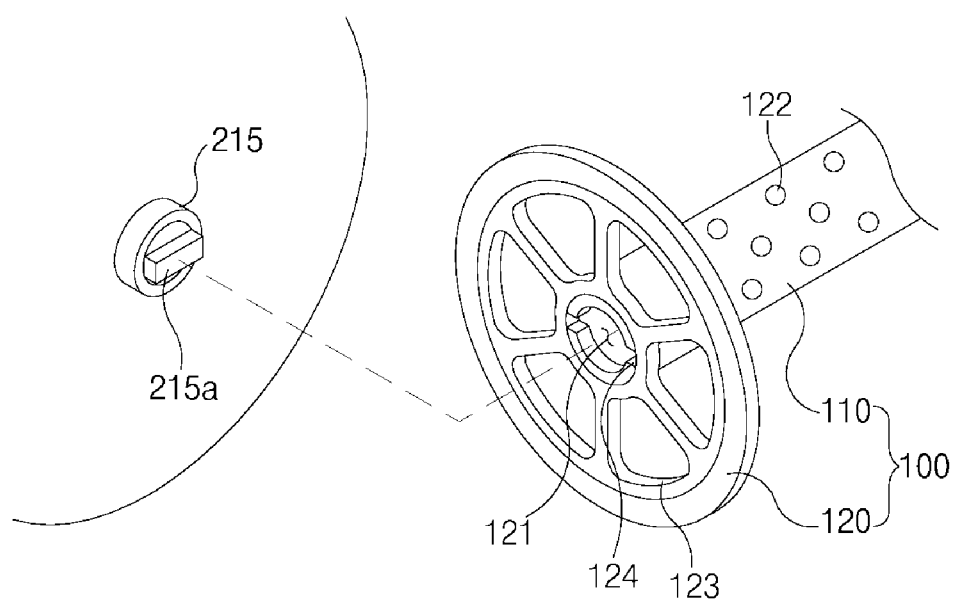
FIG. 8 is a perspective view illustrating the coupling of the bobbin and the rotation member to each other.

For example, as illustrated in FIG. 8, a coupling protrusion 215a having a straight-line shape is disposed on one surface of the rotation member 215, and a coupling groove 124 having a straight-line shape and coupled to the coupling protrusion 215a is defined in the end of the bobbin 100. That is, when the rotation member 215 rotates the bobbin 100 can rotate in the same direction through the coupling of the coupling protrusion 215a and the coupling groove 124. As a result, the bobbin 100 can be rotatably installed inside the gelling tank 210.

The main body 200 further comprises a second installation member 230 on which the silica sol supply member 400 is installed, as shown in FIG. 1. The second installation member 230 comprises a bottom piece 231, an installation frame 232 installed on an upper portion of the bottom piece 231 and installed so that the silica sol supply member 400 is disposed higher than that gelling tank 210, and a stair 233 installed on an end of one side of the bottom piece 231.

The gelling tank comprises a rotation handle 216 coupled to the other rotation member 215 (the left rotation member when viewed in FIG. 1) provided in the gelling tank to allow the bobbin to rotate. The rotation handle 216 can allow the bobbin 100 to be manually rotated outside of the gelling tank.

Figure 9:
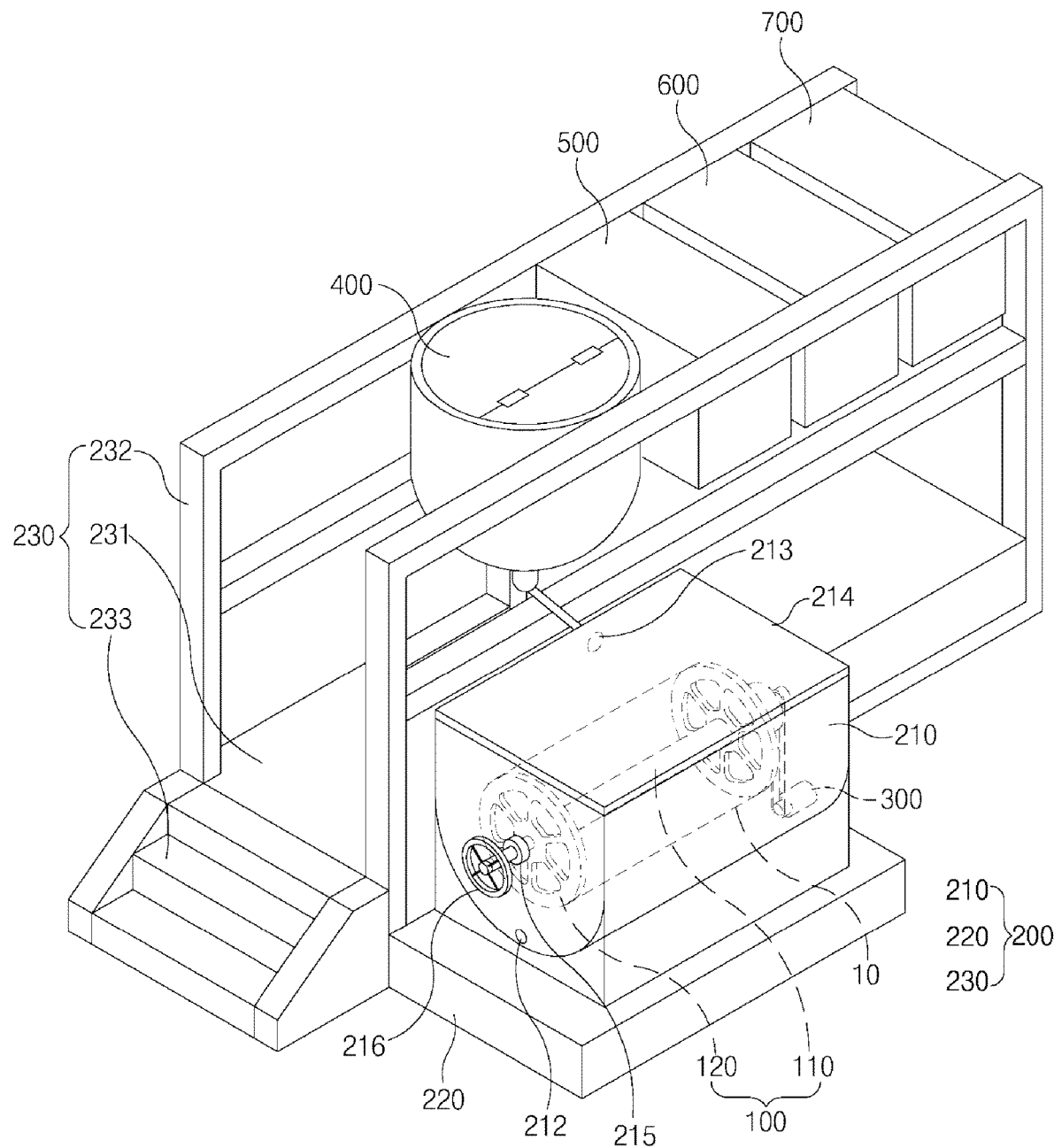
FIG. 9 is a perspective view illustrating an aging member, a surface modifying member, and a drying member in the apparatus for preparing the aerogel blanket according to the first embodiment of the present invention.

Referring to FIG. 9, the aging member 500, the surface modifying member 600, and the drying member 700 are further installed on the installation frame 232 of the second installation member 230.

Driving Member

The driving member 300 is configured to allow the bobbin accommodated in the gelling tank to rotate. The driving member 300 is connected to the other rotation member 215 (the right rotation member when viewed in FIG. 1) provided in the gelling tank 210 to transmit power. That is, when the rotation member 215 rotates, the driving member 300 can be interlocked with the rotation member 215 to allow the bobbin 100 accommodated in the gelling tank 210 to rotate.

Silica Sol Supply Member

The silica sol supply member 400 is configured to gelate the blanket by injecting the silica sol into the gelling tank to impregnate the blanket wound around the bobbin. The silica sol supply member 400 is installed on the installation frame 232 to supply the silica sol into the gelling chamber 211 through the inflow part 213 of the gelling tank 210.

Aging Member

The aging member 500 is configured to age the blanket wound around the bobbin. The aging member 500 is installed on the installation frame 232 to supply an aging solution into the gelling chamber 211 through the inflow part 213 of the gelling tank 210.

Surface Modifying Member

The surface modifying member 600 is configured to inject a surface modifying solution into the gelling tank so as to modify the surface of the blanket. The surface modifying member 600 is installed on the installation frame 232 to supply the surface modifying solution into the gelling tank 210 through the inflow part 213.

Drying Member

The drying member 700 is configured to supply high-temperature hot air into the gelling tank so as to dry the blanket wound around the bobbin. The drying member 700 is installed on the installation frame 232 and rises a temperature of the gelling tank 210 to dry the blanket 10 accommodated in the gelling tank 210.

Thus, in the apparatus for preparing the aerogel blanket according to the first embodiment of the present invention, the time taken to prepare the aerogel blanket can be significantly reduced, and the productivity of the aerogel blanket can be significantly improved to mass-produce the aerogel blanket.

Particularly, the apparatus for preparing the aerogel blanket according to the first embodiment of the present invention can induce the stable gelation regardless of a thickness and length of the blanket as the blanket rotates. Since the bobbin rotates, the entire blanket wound around the bobbin can be uniformly gelated. Also, since only the bobbin rotates and the gelling tank does not rotate, the gelling tank is not limited in shape. Also, since the gelling chamber of the gelling tank has the 'U'-shaped cross-sectional shape, the blanket wound around the bobbin can be more effectively gelated.

Hereinafter, a method of preparing the aerogel blanket according to the first embodiment of the present invention will be described.

<Method for Preparing Aerogel Blanket According to First Embodiment of the Present Invention>

Figure 10:
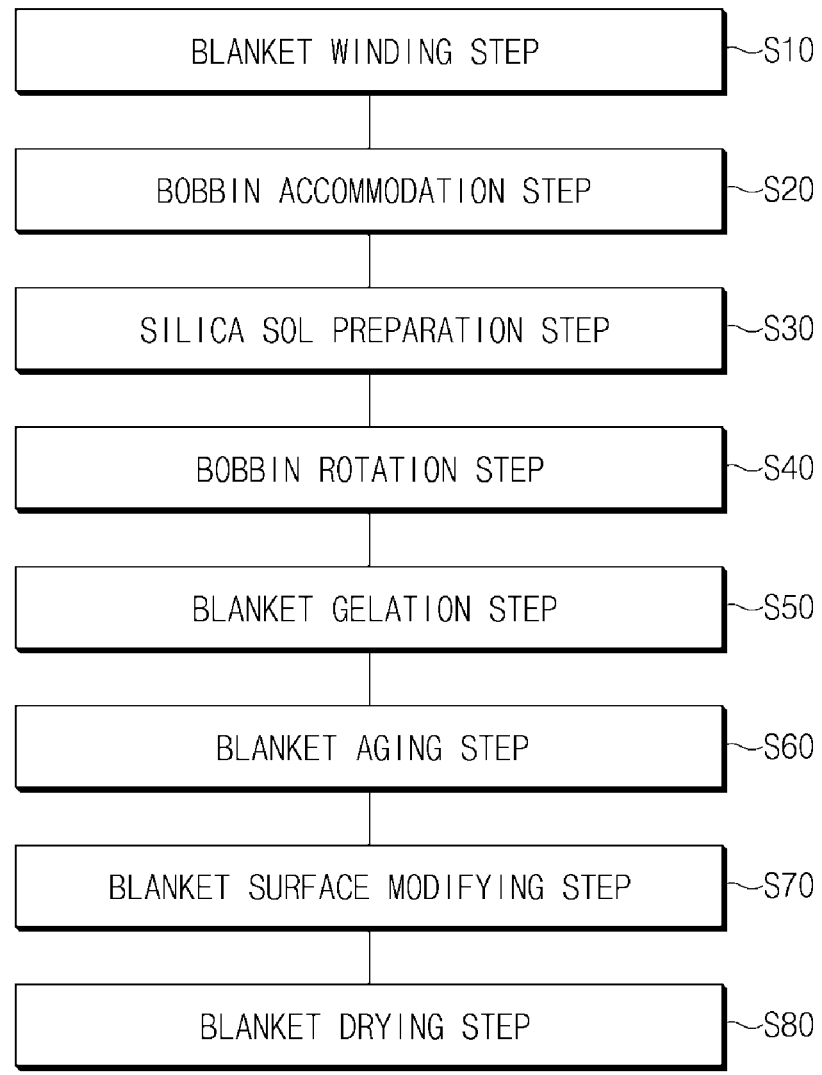
FIG. 10 is a flowchart illustrating a method for preparing an aerogel blanket according to the first embodiment of the present invention.

As illustrated in FIGS. 1, 9, and 10, a method for preparing the aerogel blanket according to the first embodiment of the present invention comprises a winding step (S10) of winding a blanket 10 around a bobbin 100, an accommodation step (S20) in which the bobbin 100 around which the blanket 10 is wound is rotatably installed inside a gelling tank 210 of a main body 200, a silica sol preparation step (S30) of injecting a precursor solution and a catalyst solution into a silica sol supply member 400 to mix the precursor solution and the catalyst solution with each other, thereby preparing silica sol, a rotation step (S40) of allowing the bobbin 100, around which the blanket 10 is wound, to rotate via a driving member 300, a gelation step (S50) of injecting the silica sol mixed in the silica sol supply member into the gelling tank 210 to impregnate the silica sol into the blanket 10 rotating by the bobbin 100, thereby gelating the blanket 10, a collection step (S60) of collecting the silica sol remaining in the gelling tank 210, an aging step (S70) of injecting an aging solution into the gelling tank 210 through the aging member 500 to age the blanket 10 rotating by the bobbin 100, a surface modifying step (S80) of injecting a surface modifying solution into the gelling tank 210 through the surface modifying member 600 to modify a surface of the blanket 10 rotating by the bobbin 100, and a drying step (S90) of rising a temperature of the gelling tank 210 through a drying member 700 to dry the blanket 10 accommodated in the gelling tank 210, thereby completing the aerogel blanket.

Winding Step

In the winding step (S10), the blanket 10 is wound in a roll shape by using the bobbin 100. That is, the blanket 10 is wound in the roll shape in a state of locating a start point of the blanket 10 at a winding rod 110 of the bobbin 100. Here, a side portion of the blanket 10 wound around the winding rod 110 can be wound uniformly as being supported by a support plate 120 at each end of winding rod 110.

Particularly, the blanket can be a porous base material in terms of improving heat insulating properties of the aerogel blanket. When the porous blanket is used, the catalyzed sol can easily penetrate into the base material to uniformly form the aerogel in the blanket. Thus, the prepared aerogel blanket can have excellent thermal insulation properties.

That is, the blanket can be a film, a sheet, a net, fiber, foam, nonwoven fabric, or a laminate having two or more layers thereof. Also, surface roughness can be formed or patterned on the surface of the blanket according to application of the blanket. More particularly, the blanket can comprise a space or pore, through which the aerogel is easily injected, to improve thermal insulation performance. It can be preferable that the blanket has low thermal conductivity.

Particularly, the blanket can be polyamide, polybenzimidazole, polyaramid, an acrylic resin, a phenol resin, polyester, polyether ether ketone (PEEK), polyolefin (for example, polyethylene, polypropylene, or a copolymer thereof), cellulose, carbon, cotton, wool, hemp, non-woven fabric, glass fiber, or ceramic wool, and more specifically, the blanket can be glass fiber (glass felt).

Accommodation Step

In the accommodation step (S20), the bobbin 100 around which the blanket 10 is wound is rotatably installed inside the gelling tank 210 provided in the main body 200. That is, the bobbin 100 is accommodated in the gelling tank 210, and then, both ends of the bobbin 100 are installed on the rotation members 215 provided on both wall surfaces of the gelling tank 210, respectively. Thus, the bobbin 100 can rotate by being interlocked with the rotation member 215. That is, when the rotation member 215 rotates, the bobbin 100 can be interlocked with the rotation member 215 to rotate. Since the bobbin 100 rotates, the blanket 10 can also rotate.

Silica Sol Preparation Step

In the silica sol preparation step (S30), the precursor solution and the catalyst solution are injected into the silica sol supply member 400 and then mixed with each other to prepare catalyzed silica sol.

The catalyzed silica sol can be prepared by mixing sol with a base catalyst, and the base catalyst allows the sol to increase in pH, thereby promoting gelation.

Here, the silica sol is not limited as long as the silica sol is a material capable of forming porous gel by a sol-gel reaction. Particularly, the silica sol can comprise inorganic sol, organic sol, or a combination thereof. The inorganic sol can comprise zirconia, yttrium oxide, hafnia, alumina, titania, ceria, silica, magnesium oxide, calcium oxide, magnesium fluoride, calcium fluoride and combinations thereof, and the organic sol can comprise polyacrylate, polyolefin, polystyrene, polyacrylonitrile, polyurethane, polyimide, polyfurfural alcohol, phenol furfuryl alcohol, melamine formaldehyde, resorcinol formaldehyde, cresol formaldehyde, phenol formaldehyde, polyvinyl alcohol dialdehyde, polysianurates, polyacrylamides, various epoxies, agar, agarose, and combinations thereof.

The silica sol can be prepared by mixing a silica precursor material with alcohol. Also, the silica sol can undergo hydrolysis at a low pH to facilitate the gelation.

Here, the precursor solution, which is the silica precursor usable for the preparation of the silica sol, can be a silicon-containing alkoxide-based compound, specifically, tetraalkyl silicate such as tetramethyl orthosilicate (TMOS), tetraethyl orthosilicate (TEOS), methyl triethyl orthosilicate, dimethyl diethyl orthosilicate, tetrapropyl orthosilicate, tetraisopropyl orthosilicate, tetrabutyl orthosilicate, tetra secondary butyl orthosilicate, tetra tertiary butyl orthosilicate, tetrahexyl orthosilicate, tetracyclohexyl orthosilicate, tetradodecyl orthosilicate, and the like. Among these, the silica precursor according to an embodiment of the present invention can be tetraethyl orthosilicate (TEOS).

The precursor solution, which is the silica precursor, can be used in an amount so that a content of silica ($SiO_2$) contained in the silica sol ranges of 3 wt % to 30 wt %. If the content of the silica is less than 3 wt %, a content of the silica aerogel in the finally prepared blanket is too low to cause a problem that a desired level of a thermal insulation effect is not expected. If the content of the silica exceeds 30 wt %, there is a fear that the silica aerogel is excessively formed to deteriorate mechanical properties of the blanket, particularly, flexibility of the blanket.

Particularly, alcohol that is capable of being used for the preparation of the silica sol can comprise monohydric alcohol such as methanol, ethanol, isopropanol and butanol; polyhydric alcohol such as glycerol, ethylene glycol, propylene glycol, diethylene glycol, dipropylene glycol, and sorbitol, or a mixture of two or more of the above materials. Among these, when considering miscibility with water and aerogel, monohydric alcohol having 1 to 6 carbon atoms such as methanol, ethanol, isopropanol, butanol, and the like can be used.

In the silica sol, the precursor solution, which is the silica precursor, and water are contained at a molar ratio of 1:4 to 1:1. Also, the silica precursor and the alcohol can be contained at a weight ratio of 1:2 to 1:9 and preferably can be contained at a weight ratio of 1:4 to 1:6. When the silica precursor solution satisfies the above weight ratio, an improvement effect in terms of the thermal insulation performance can be improved.

The base catalysts usable in the catalyzed silica sol can be inorganic bases such as sodium hydroxide and potassium hydroxide; or organic bases such as ammonium hydroxide. Particularly, the base catalysts can be one or more selected from the group consisting of sodium hydroxide (NaOH), potassium hydroxide (KOH), calcium hydroxide ($Ca(OH)_2$), ammonia ($NH_3$), ammonium hydroxide ($NH_4OH$), tetramethylammonium hydroxide (TMAH), tetraethylammonium hydroxide (TEAH), tetrapropylammonium hydroxide (TPAH), tetrabutylammonium hydroxide (TBAH), methylamine, ethylamine, isopropylamine, monoisopropylamine, diethylamine, diisopropylamine, dibutylamine, trimethylamine, triethyl-amine, triisopropylamine, tributylamine, choline, monoethanolamine, diethanolamine, 2-aminoethanol, 2-(ethyl amino)ethanol, 2-(methyl amino)ethanol, N-methyl diethanolamine, dimethylaminoethanol, diethylaminoethanol, nitrilotriethanol, 2-(2-aminoethoxy)ethanol, 1-amino-2-propanol, triethanolamine, monopropanolamine, dibutanolamine, and preferably, can be sodium hydroxide, ammonia, ammonium hydroxide, or a mixture thereof.

The base catalyst can be contained in an amount so that the sol has a pH of 7 to 11. When the pH of the silica sol is out of the above range, the gelation may not be easy, or a gelation rate may be too slow to deteriorate processability. Also, since the base is precipitated when being put into a solid phase, it may be preferable to be added in a solution phase that is diluted with the above-mentioned alcohol (a polar organic solvent). Here, a dilution ratio of the base catalyst and the alcohol can be 1:4 to 1:100 based on a volume.

When the method for preparing the silica sol is described in more detail with reference to the above components, the precursor solution is prepared by mixing an alkoxide-based silica precursor with water and ethanol in the silica sol supply member 400. Here, when the silica precursor is tetraethyl orthosilicate (TEOS), TEOS and ethanol are diluted to have a weight ratio of 1:5, and then, TEOS and water are mixed at a molar ratio of 1:4. Next, TEOS is hydrolyzed. Here, hydrochloric acid is added so that the silica precursor solution has a pH of 3 or less to promote the hydrolysis. Next, an opacifying agent and a flame retardant corresponding to a weight ratio of 0 to 1 of the precursor solution are put into the precursor solution and stirred for 30 minutes. Next, 0 to 10 vol % of an ammonia ethanol solution (base catalyst solution) is mixed with the precursor solution to prepare the silica sol.

Rotation Step

In the rotation step (S40), the rotation member 215 of the gelling tank 210 rotates through the driving member 300. Thus, the bobbin 100 accommodated in the gelling tank 210 can rotate through the rotation member 215, and the blanket 10 wound around the bobbin 100 in the roll shape can rotate inside the gelling tank 210 by the rotation of the bobbin 100. Here, the bobbin 100 can stably rotate by two rotation members 215 provided in the gelling tank 210.

Gelation Step

In the gelation step (S50), the silica sol mixed in the silica sol supply member 400 is supplied through an inflow part 213 of the gelling tank 210. Thus, the silica sol supplied to the gelling tank 210 can be impregnated into the blanket 10 wound around the bobbin 100 to gelate the blanket 10. Particularly, since the blanket 10 wound around the bobbin 100 rotates, the entire blanket 10 can be uniformly gelated.

Collection Step

In the collection step (S60), when the gelation is completed, the silica sol remaining in the gelling chamber 211 is discharged to the outside through the discharge part 212 of the gelling tank 210 and then is collected.

Aging Step

In the aging step (S70), an aging solution 500 of the aging member 500 is injected through the inflow part 213 of the gelling tank 210 to age the blanket 10 rotating by the bobbin 100. That is, 1% to 10 vol % of ammonia and ethanol solution are injected to the gelling tank 210, and the gelling tank 210 is aged for 25 minutes to 100 minutes while the gelling tank is maintained at a temperature at 25° C. to 80° C. When the aging of the blanket is completed, the aging solution remaining in the gelling chamber 211 is collected through the discharge part 212 of the gelling tank 210. Here, the blanket 10 can be maintained in the rotating state due to the bobbin 100 to effectively age the surface of the blanket 10.

Surface Modifying Step

In the surface modifying step (S80), a surface modification solution of the surface modifying member 600 is injected into the gelling tank 210 to modify the surface of the blanket 10 rotating by the bobbin 100. That is, to modify the surface of the blanket 10, the surface modification is performed for 1 hour to 24 hours at 1 vol % to 10 vol % of a hexamethyldisilazane (HMDS) ethanol diluted solution. When the surface modification of the blanket is completed, the surface modifying solution remaining in the gelling tank 210 is collected. Here, the blanket 10 can be maintained in the rotating state due to the bobbin 100 to more effectively modify the surface of the blanket 10.

Drying Step

In the drying step (S90), a temperature inside the gelling tank 210 increases through the drying member 700 to dry the blanket 10 accommodated in the gelling tank 210, thereby completing the aerogel blanket. That is, $CO_2$ is injected through the inflow part 213 of the gelling tank 210, a temperature of the gelling tank 210 increases to 60° C. over 1 hour, and supercritical drying is performed at a temperature of 60° C. and a pressure of 100 bar. Ambient drying is performed on the blanket 10 for 2 hours in a state in which the gelling tank 210, in which the supercritical drying is completed, increases to a temperature of 200° C. to completely remove residual salt and moisture. Thus, a hydrophobic silica aerogel blanket can be prepared.

Here, since the blanket 10 rotates by the bobbin 100, the entire blanket 10 can be uniformly dried.

Therefore, in the method for preparing the aerogel blanket according to the present invention, the silica sol in the blanket can be gelated, aged, surface-modified, and dried in the gelling tank to prepare a finished product aerogel blanket.

Hereinafter, in describing another embodiment of the present invention, a constituent having the same function as that described in the foregoing embodiment will be denoted by the same reference symbol, and its duplicated description will be omitted.

<Apparatus for Preparing Aerogel Blanket According to Second Embodiment of the Present Invention>

Figure 2:
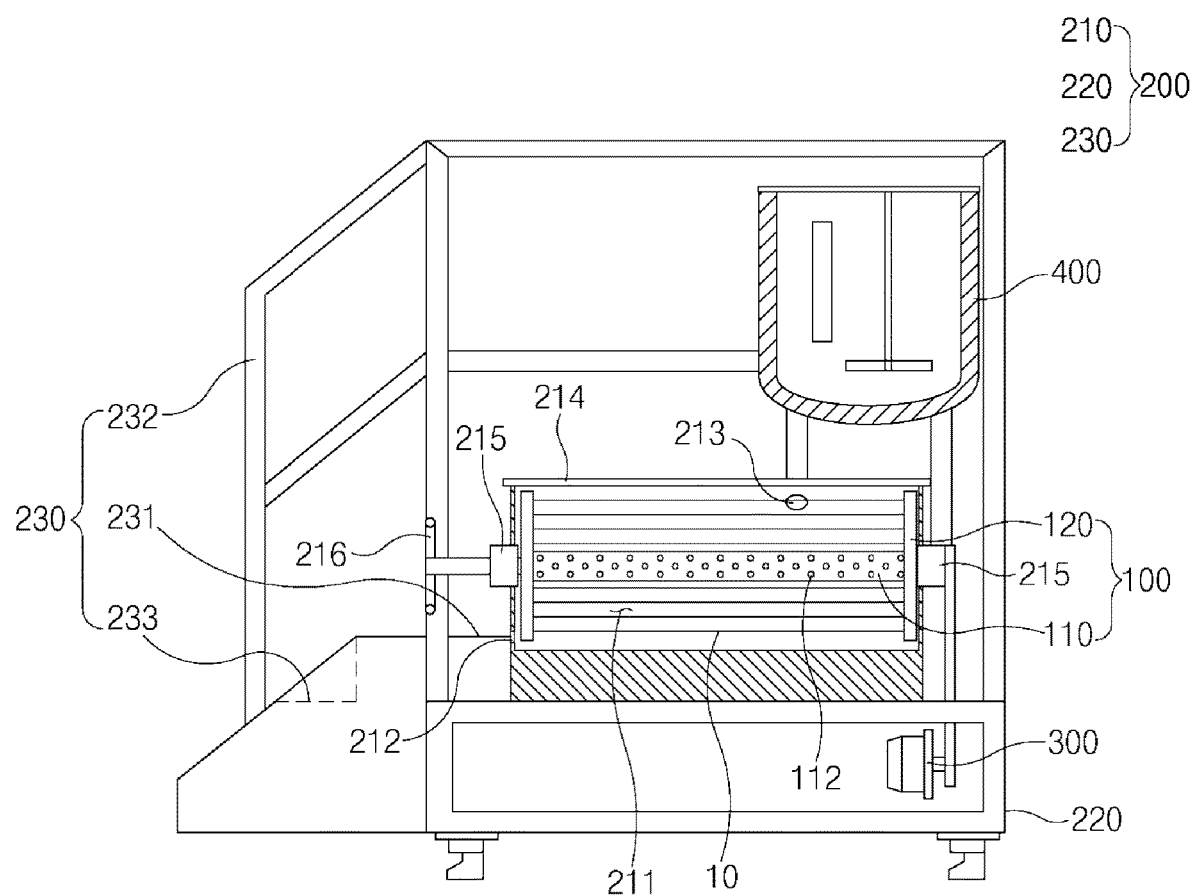
FIG. 2 is a front view of FIG. 1.
Figure 3:
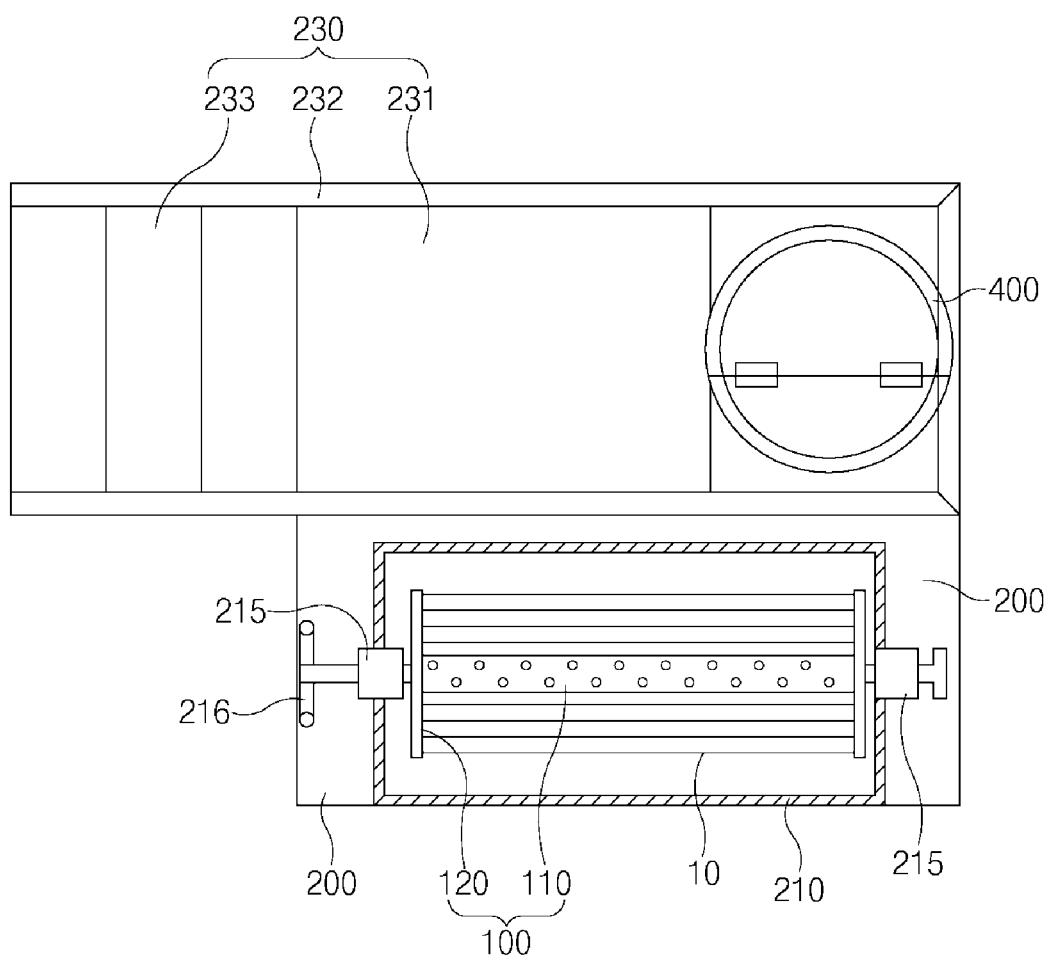
FIG. 3 is a plan view of FIG. 1.
Figure 4:
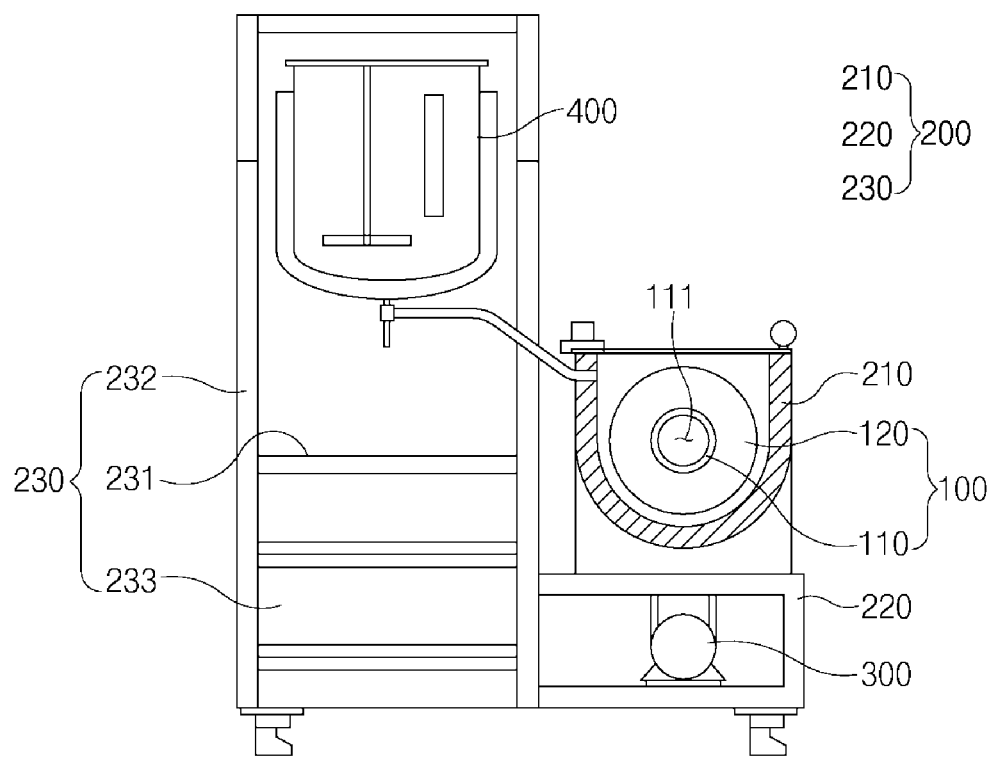
FIG. 4 is a side view of FIG. 1.

As illustrated in FIG. 2, an apparatus for preparing an aerogel blanket according to a second embodiment of the present invention comprises a bobbin 100 around which a blanket 10 is wound, and the bobbin 100 comprises a winding rod 110 and a support plate 120 at each end of the winding rod 110.

Here, a fixing clip 113 into which a winding start point of the blanket 10 is fitted and fixed is provided on an outer circumferential surface of the winding rod 110.

Figure 11:
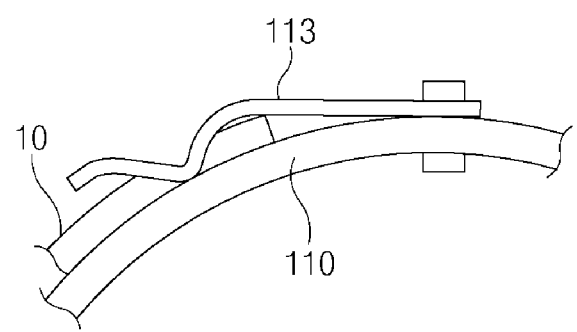
FIG. 11 is a cross-sectional view illustrating a fixing clip of an apparatus for preparing an aerogel blanket according to a second embodiment of the present invention.

That is, referring to FIG. 11, the fixing clip 113 has a pin shape having an elastic restoring force and has one end fixed to the outer circumferential surface of the winding rod 110 and the other end that is elastically supported on an outer circumferential surface of the winding rod 110. Therefore, when the start point of the blanket 10 is inserted between the other end of the fixing clip 113 and the winding rod 110, the start point of the winding rod 110 can be fixed to the blanket 10 by the elastic force of the fixing clip 113. As a result, the blanket 10 can be easily wound around the outer circumferential surface of the winding rod 110.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

LISTING OF REFERENCE NUMERALS

10 Blanket
20 Silica sol
100 Bobbin
110 Winding rod
111 Hollow
112 Connection hole
113 Fixing clip
120 Support plate
121 Coupling groove
122 Coupling hole
123 Opening hole
124 Coupling groove
200 Main body
210 Gelling tank
211 Gelling chamber
212 Discharge part
213 Inflow part
214 Cover
215 Rotation member
215a Coupling protrusion
216 Rotation handle
220 First installation member
230 Second installation member
231 Bottom piece
232 Installation frame
233 Stair
300 Driving member
400 Silica sol supply member
500 Aging member
600 Surface modifying member
700 Drying member

The invention claimed is:

1. An apparatus for preparing an aerogel blanket, the apparatus comprising:
a bobbin around which a blanket is wound;
a main body provided with a gelling tank enclosing a gelling chamber inside the gelling tank in which the bobbin is accommodated, the gelling tank having a U-shaped cross-sectional shape of which an upper portion is covered by a cover that can be opened, a lower portion having a curvature corresponding to the blanket wound around the bobbin, and having a first wall and an opposite second wall;
a driving member configured to transmit power to the bobbin accommodated in the gelling tank to rotate the bobbin; and
a silica sol supply tank in which a precursor solution and a catalyst solution are mixed to prepare a silica sol, the silica sol supply tank connected to the gelling tank to deliver the silica sol into the gelling tank via an inflow inlet at an upper end of the gelling tank to the blanket and lower portion of the gelling tank to impregnate the blanket rotating by the bobbin,
wherein the bobbin comprises:
a winding rod around which the blanket is wound in a roll shape; and
a support plate coupled to each end of the winding rod to support a side portion of the blanket wound around the winding rod, each support plate comprising a plurality of opening holes through which the silica sol delivered to the gelling tank can be introduced into the side portion of the blanket wound around the winding rod, wherein the winding rod comprises:
an inner portion comprising a hollow;
a plurality of connection holes in an outer circumferential surface of the winding rod and connected to the hollow through which the silica sol injected into the gelling tank is introduced into the hollow; and
an outer portion comprising a plurality of connection holes, through which the silica sol introduced into the hollow is discharged to the outside of the winding rod so as to impregnate the inside of the blanket wound around the winding rod.

2. The apparatus of claim 1, wherein the gelling tank further comprises a discharge outlet provided at an outer lower end of the gelling tank.

3. The apparatus of claim 1, wherein the gelling tank further comprises a first rotator provided on the first wall and a second rotator provided on the second wall of the gelling tank, and the first rotator is coupled to one end of the bobbin and the second rotator is coupled to the other end of the bobbin so that the bobbin is rotatably installed in the gelling chamber.

4. The apparatus of claim 3, wherein a coupling groove is defined in each of both ends of the bobbin, and a coupling protrusion is disposed on each of the first and second rotators, and
the bobbin and the first and second rotators are interlocked with each other to rotate by coupling of the coupling groove and the coupling protrusion.

5. The apparatus of claim 3, wherein the driving member transmits power to the first rotator to allow the bobbin to be rotated.

6. The apparatus of claim 3, wherein the gelling tank further comprises a rotation handle coupled to the second rotator to allow the bobbin to be manually rotated.

7. A method for preparing an aerogel blanket, the method using the apparatus of claim 6 and comprising:
winding a blanket around the bobbin of the apparatus as a winding step (S10);
rotatably installing the bobbin around which the blanket is wound inside the gelling tank of the apparatus, as an accommodation step (S20);
injecting a precursor solution and a catalyst solution into the silica sol supply tank of the apparatus to mix the precursor solution and the catalyst solution with each other, thereby preparing a silica sol, as a silica sol preparation step (S30);
rotating the bobbin, around which the blanket is wound, via the driving member of the apparatus within the gelling tank of the apparatus, as a rotation step (S40); and
injecting the silica sol mixed in the silica sol supply tank of the apparatus into the gelling tank of the apparatus to impregnate the silica sol into the blanket rotating by the bobbin, thereby gelating the blanket, as a gelation step (S50).

8. The method of claim 7, further comprising, after the gelation step (S50), collecting the silica sol remaining in the gelling tank of the apparatus, as a collection step (S60).

9. The method of claim 8, further comprising, after the collection step (S60), injecting an aging solution into the gelling tank of the apparatus to age the blanket rotating by the bobbin of the apparatus, and collecting the aging solution remaining in the gelling tank of the apparatus when the aging of the blanket is completed, as an aging step (S70).

10. The method of claim 9, further comprising, after the aging step (S70), injecting a surface modifying solution into the gelling tank of the apparatus to modify a surface of the blanket rotating by the bobbin of the apparatus, and collecting the surface modifying solution remaining in the gelling tank of the apparatus when the surface modification of the blanket is completed, as a surface modifying step (S80).

11. The method of claim 10, further comprising, after the surface modifying step (S80), drying the blanket to complete the aerogel blanket.

12. The method of claim 7, wherein, in the accommodation step (S20), rotatably installing the bobbin of the apparatus around which the blanket is wound in the gelling chamber of the gelling tank of the apparatus comprises coupling one end of the bobbin to the first rotator provided on the first wall of the gelling tank of the apparatus and coupling the other end of the bobbin to the second rotator provided on the second wall of the gelling tank of the apparatus.

\* \* \* \* \*

UNITED STATES PATENT AND TRADEMARK OFFICE
CERTIFICATE OF CORRECTION

| | | |
|---|---|---|
| PATENT NO. | : 12,053,753 B2 | Page 1 of 1 |
| APPLICATION NO. | : 17/416619 | |
| DATED | : August 6, 2024 | |
| INVENTOR(S) | : Kang et al. | |

It is certified that error appears in the above-identified patent and that said Letters Patent is hereby corrected as shown below:

In the Claims

In Claim 7, at Column 13, Line 39, "claim 6" should read —claim 3—.

Signed and Sealed this
Twenty-fourth Day of September, 2024

Katherine Kelly Vidal
*Director of the United States Patent and Trademark Office*